US009490899B1

(12) United States Patent
Nguyen et al.

(10) Patent No.: US 9,490,899 B1
(45) Date of Patent: Nov. 8, 2016

(54) OPTICAL TUNABLE-BASED TRANSMITTER FOR MULTIPLE RADIO FREQUENCY BANDS

(71) Applicant: The United States of America as represented by the Administrator of the National Aeronautics and Space Administration, Washington, DC (US)

(72) Inventors: Hung Nguyen, Cleveland, OH (US); Rainee N. Simons, North Olmsted, OH (US); Edwin G. Wintucky, Willoughby, OH (US); Jon C. Freeman, Beachwood, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 85 days.

(21) Appl. No.: 14/268,334

(22) Filed: May 2, 2014

Related U.S. Application Data (60) Provisional application No. 61/824,562, filed on May 17, 2013.

(51) Int. Cl.
  *H04B 10/04* (2006.01)
  *H04B 10/50* (2013.01)
  *H04J 14/02* (2006.01)
  *H04B 10/572* (2013.01)

(52) U.S. Cl.
  CPC .......... *H04B 10/503* (2013.01); *H04B 10/572* (2013.01); *H04J 14/02* (2013.01)

(58) Field of Classification Search
  CPC H04B 10/572; H04B 10/506; H04B 10/503; H04B 10/505; H04B 10/5053; H04B 10/50; H04B 10/2507; H04B 10/00; H04B 10/54; H04B 10/548; H04J 14/02; H04Q 2011/0018; G02F 2203/055; G01B 2290/45; G02B 6/02057
  USPC .......... 398/79, 182, 183, 186–189, 196, 90, 398/95, 85
  See application file for complete search history.

(56) References Cited

U.S. PATENT DOCUMENTS

| | | | |
|---|---|---|---|
| 5,991,477 A | 11/1999 | Ishikawa et al. | |
| 6,226,424 B1 | 5/2001 | Ball et al. | |
| 6,330,255 B1 | 12/2001 | Hung | |
| 6,333,941 B1 | 12/2001 | Hung | |
| 6,388,782 B1 * | 5/2002 | Stephens ................. | H01S 5/146 372/18 |

(Continued)

OTHER PUBLICATIONS

Nguyen, Hung, Simons, Rainee, Wintucky, Edwin, Freeman, Jon; title "Demonstration of Space Optical Transmitter Development for Multiple High Frequency Bands"; SPIE 2013 Defense Security Plus Sensing Conference, Baltimore Convention Center, Baltimore, MD; Apr. 29 to May 3, 2013; U.S.A.

*Primary Examiner* — Hibret Woldekidan
(74) *Attorney, Agent, or Firm* — Robert H. Earp, III

(57) ABSTRACT

An optical tunable transmitter is used to transmit multiple radio frequency bands on a single beam. More specifically, a tunable laser is configured to generate a plurality of optical wavelengths, and an optical tunable transmitter is configured to modulate each of the plurality of optical wavelengths with a corresponding radio frequency band. The optical tunable transmitter is also configured to encode each of the plurality of modulated optical wavelengths onto a single laser beam for transmission of a plurality of radio frequency bands using the single laser beam.

9 Claims, 6 Drawing Sheets

(56) References Cited

U.S. PATENT DOCUMENTS

| | | | |
|---|---|---|---|
| 6,587,214 B1 * | 7/2003 | Munks | G01J 9/00 356/519 |
| 6,611,546 B1 | 8/2003 | Garnache et al. | |
| 6,661,974 B1 | 12/2003 | Akiyama et al. | |
| 6,678,480 B1 | 1/2004 | Aoki et al. | |
| 6,768,827 B2 * | 7/2004 | Yoo | B82Y 20/00 385/14 |
| 7,155,127 B2 | 12/2006 | Akimoto et al. | |
| 7,962,045 B2 | 6/2011 | McCallion et al. | |
| 8,306,375 B2 | 11/2012 | Kato | |
| 8,811,828 B2 * | 8/2014 | Olsson | H04B 10/2575 398/204 |
| 9,240,857 B2 * | 1/2016 | Elahmadi | H04B 10/2507 |
| 2002/0181515 A1 * | 12/2002 | Vilhemsson | G01J 9/0246 372/20 |
| 2003/0039010 A1 * | 2/2003 | Akimoto | H04B 10/40 398/139 |
| 2004/0165641 A1 | 8/2004 | Garnache et al. | |
| 2010/0254416 A1 * | 10/2010 | Suzuki | H01S 5/0687 372/20 |
| 2011/0013911 A1 * | 1/2011 | Alexander | H04B 10/29 398/79 |
| 2011/0033192 A1 | 2/2011 | Daiber et al. | |
| 2012/0212360 A1 * | 8/2012 | Kanter | H03M 1/1245 341/120 |
| 2012/0328298 A1 * | 12/2012 | Yi | H01Q 3/2676 398/96 |
| 2013/0039645 A1 | 2/2013 | Effenberger | |
| 2013/0209105 A1 | 8/2013 | Jeong et al. | |

* cited by examiner

350

OPTICAL TUNABLE-BASED TRANSMITTER FOR MULTIPLE RADIO FREQUENCY BANDS

CROSS REFERENCE TO RELATED APPLICATION

This application is a non-provisional of, and claims priority to, U.S. Provisional Patent Application Ser. No. 61/824,562 filed May 17, 2013. The subject matter of this earlier-filed application is hereby incorporated by reference in its entirety.

ORIGIN OF THE INVENTION

The invention described herein was made by employees of the United States Government and may be manufactured and used by or for the Government for Government purposes without the payment of any royalties thereon or therefore.

FIELD

The present invention generally pertains to an optical transmitter, and more specifically, to optical tunable-based transmitter for transmission of multiple radio frequency bands through a single laser beam.

BACKGROUND

Traditionally, when transmitting from a satellite terminal to a ground station, multiple radio frequency bands used on the satellite terminal are transmitted by a separate transmitter terminal for each radio frequency band. For example, if the satellite terminal carries four radio frequency bands, the satellite terminal uses four different transmitters and four corresponding antennas. This increases the number of hardware components, including the number of transmitters and antennas for each frequency band, thus increasing the weight, mass and power consumption of the satellite payload. This also limits the data throughput, thus making the transmission system inefficient.

A single multi-wavelength optical tunable-based laser transmitter configured to deliver multiple radio frequency bands using a single laser beam may be beneficial.

SUMMARY

Certain embodiments of the present invention may be implemented and provide solutions to the problems and needs in the art that have not yet been fully solved by conventional transmitters. For example, a multi-wavelength optical tunable laser transmitter may transmit individually or simultaneously multiple radio frequency bands including, but not limited to, L, C, X, Ku, and Q frequency bands using a single laser beam.

In one embodiment, an apparatus includes a tunable laser configured to generate a plurality of optical wavelengths. The apparatus also includes an optical transmitter. The optical transmitter is configured to modulate each of the plurality of optical wavelengths with a corresponding radio frequency band. The optical transmitter is also configured to encode each of the plurality of modulated optical wavelengths onto a single laser beam for transmission of a plurality of radio frequency bands using the single laser beam.

In another embodiment, an apparatus includes a tunable laser and an optical transmitter. The tunable laser generates a plurality of optical wavelengths. Each of the plurality of optical wavelengths are associated with a corresponding radio frequency band. The optical transmitter modulates each of the plurality of optical wavelengths with a corresponding radio frequency band. The optical transmitter also encodes each of the plurality of modulated optical wavelengths onto a single laser beam for transmission of plurality of radio frequency bands using the single laser beam.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Embodiments of the present invention pertain to a multi-wavelength optical tunable-based laser transmitter that is configured to combine multiple radio frequency bands (hereinafter "frequency bands") onto a single laser beam for transmission. Stated differently, the multi-wavelength optical tunable-based transmitter is configured to output simultaneously one or more radio frequency bands using a single laser beam. This allows for transmission of data from a spacecraft to another spacecraft or ground in a free space optical communication system. It should be appreciated that the spacecraft may be a manned space vehicle, unmanned space vehicle, robotic spacecraft, space station, satellite, etc. In certain embodiments, a fiber optic cable may be used for transmission of the laser beam rather than in free space.

Figure 1:
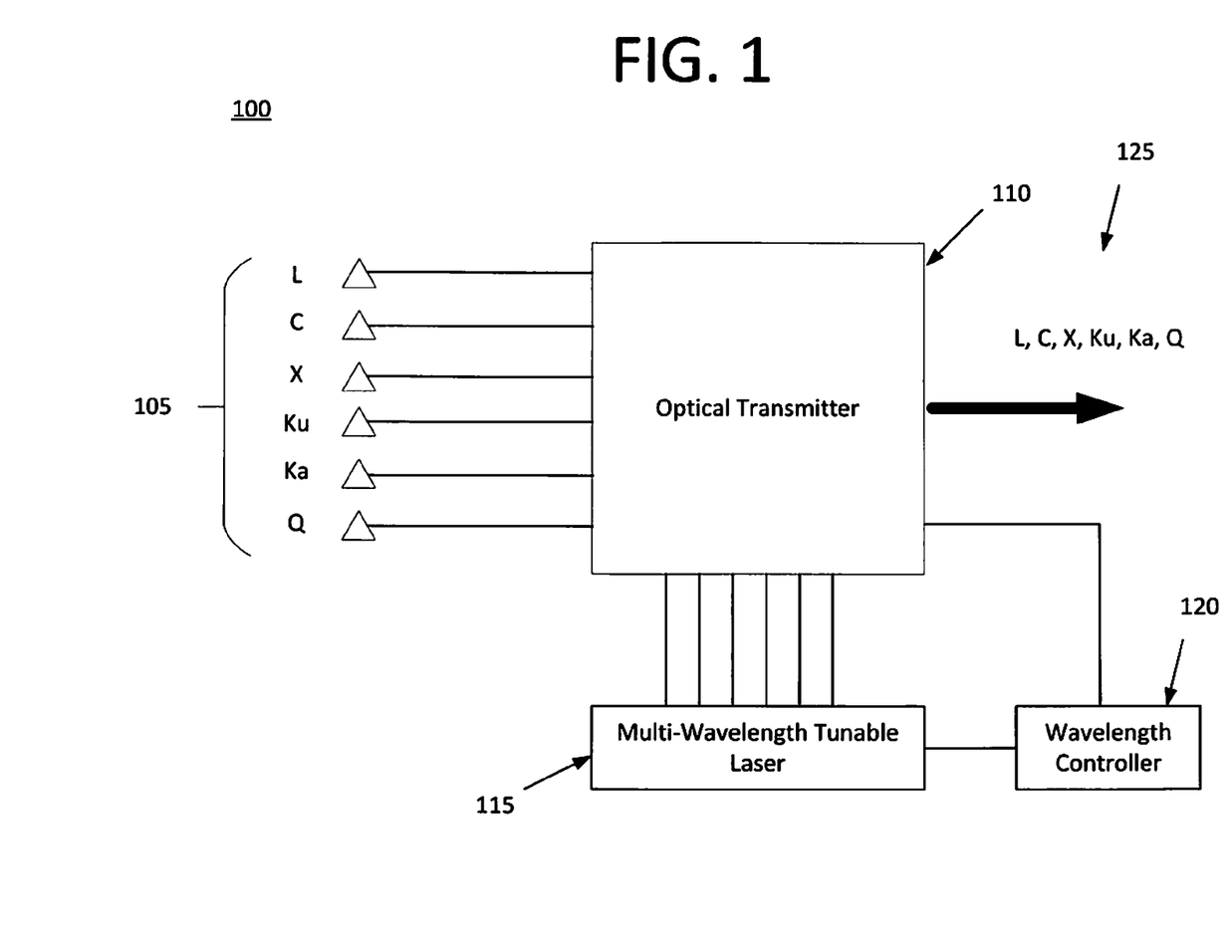
FIG. 1 is a block diagram illustrating a multi-wavelength optical tunable-based laser transmitter for multiple radio frequency bands, according to an embodiment of the present invention.

FIG. 1 is a block diagram illustrating a multi-wavelength optical tunable-based laser transmitter 100 for multiple radio frequency bands, according to an embodiment of the present invention. In this embodiment, radio frequency bands L, C, X, Ku, Ka, Q may be generated by corresponding frequency generators 105, and may be transmitted by optical transmitter 110 using a single laser beam 125. Each radio frequency band L, C, X, Ku, Ka, Q may carry data, for example, from a particular science instrument on the spacecraft.

In FIG. 1, optical transmitter 110 may encode single laser beam 125 with multiple optical wavelengths for transmission. Each of the optical wavelengths have the capability of carrying one of the radio frequency bands L, C, X, Ku, Ka, Q. It should be appreciated that the embodiments described herein are not limited to frequency bands L, C, X, Ku, Ka, and Q and may include any radio frequency band that would be appreciated by a person of ordinary skill in the art. In other words, the radio frequencies and the number of radio frequency bands may change depending on the desired use of optical tunable-based transmitter 100.

In this embodiment, the multiple optical wavelengths are generated separately and modulated with a corresponding radio frequency band. In one embodiment, the multiple optical wavelengths are then combined onto laser beam 125 for transmission to, for example, a telescope (not shown) on ground. In other embodiments, where the distance between optical tunable-based transmitter 100 and a receiver on another platform or ground are great, the multiple optical wavelengths are then combined onto laser beam 125 and amplified to increase power as required for successful transmission. A similar process may be carried out by transmitters 200, 400 shown in FIGS. 2 and 4. A description of the optical wavelength generation and radio frequency combining is described in more detail below.

In this embodiment, a multi-wavelength tunable laser 115 is configured to generate multiple optical wavelengths. For example, in FIG. 1, multi-wavelength tunable laser 115 is configured to generate six optical wavelengths, one for each of radio frequency bands L, C, X, Ku, Ka, Q. Wavelength controller 120 is configured to select the six optical wavelengths generated by the multi-wavelength tunable laser 115.

Figure 2:
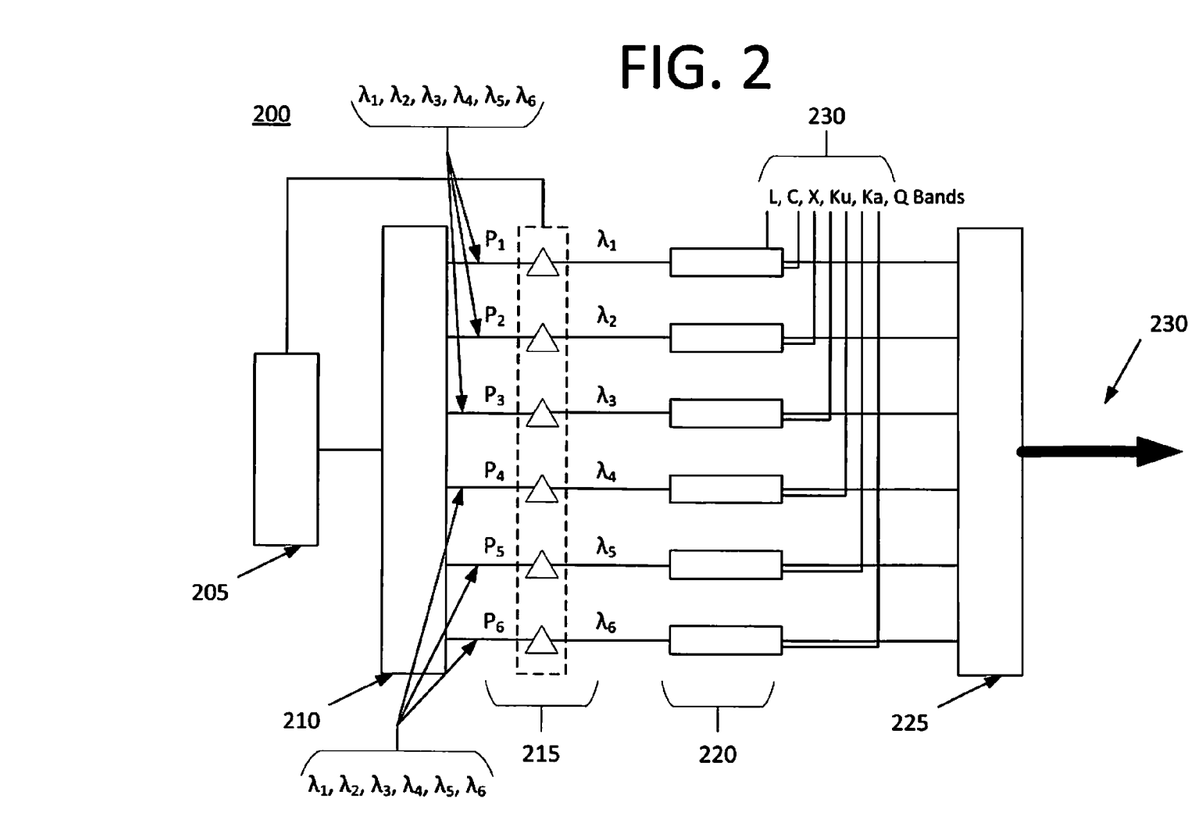
FIG. 2 is a block diagram illustrating a multi-wavelength optical tunable-based laser transmitter for multiple radio frequency bands, according to an embodiment of the present invention.

FIG. 2 is a block diagram illustrating a multi-wavelength optical tunable-based laser transmitter 200 for multiple radio frequency bands, according to an embodiment of the present invention. In this embodiment, multi-wavelength tunable laser 205 is configured to simultaneously generate multiple wavelengths on a single laser beam. For example, in FIG. 2, six wavelengths $\lambda_1$, $\lambda_2$, $\lambda_3$, $\lambda_4$, $\lambda_5$, $\lambda_6$ are simultaneously generated by multi-wavelength tunable laser 205, one for each radio frequency band L, C, X, Ku, Ka, Q.

A demultiplexer 210 simultaneously channels all six optical wavelengths $\lambda_1$, $\lambda_2$, $\lambda_3$, $\lambda_4$, $\lambda_5$, $\lambda_6$ into each of the six optical paths $P_1$, $P_2$, $P_3$, $P_4$, $P_5$, $P_6$. The number of optical wavelength paths may correspond to the number of radio frequency bands. In FIG. 2, since there are six radio frequency bands L, C, X, Ka, Ku, Q, six optical wavelength paths $P_1$, $P_2$, $P_3$, $P_4$, $P_5$, $P_6$ are shown.

An optical filter 215 may allow transmission of a desired optical wavelength to electro-optic modulator 220. It should be appreciated that a separate optical filter is used for each optical path. In this embodiment, an optical wavelength controller (not shown) may control each optical filter 215. This way, all undesired optical wavelengths are prevented from transmission. For example, if frequency bands L, X, Ku, Q are to be transmitted, optical filter 215 associated with optical paths $P_2$, $P_5$ may prevent optical wavelengths $\lambda_2$, $\lambda_5$ from transmission. This allows optical wavelengths $\lambda_1$, $\lambda_3$, $\lambda_4$, $\lambda_6$ associated with radio frequency bands L, X, Ku, Q, respectively, to be transmitted to a corresponding electro-optic modulator 220 via optical wavelength paths $P_1$, $P_3$, $P_4$, $P_6$.

Also received at each electro-optic modulator 220 is a corresponding radio frequency band via radio frequency input ports 230. Each electro-optic modulator 220 may modulate an optical wavelength with a corresponding radio frequency band. Taking the above example, if radio frequency bands L, X, Ku, Q are to be transmitted, electro-optic modulator 220 on optical wavelength path $P_1$ may modulate optical wavelengths $\lambda_1$ with radio frequency band L. Similar functionality is carried out by electro-optic modulator 220 on wavelength paths $P_3$, $P_4$, $P_6$.

Multiplexer 225 may combine the modulated optical wavelengths, and encode a single laser beam 230 to include the modulated optical wavelengths. In certain embodiments, these modulated optical wavelengths can be considered as being different colors of light. In the same example, each modulated optical wavelength $\lambda_1$, $\lambda_3$, $\lambda_4$, $\lambda_6$ is combined and encoded onto a single laser beam to carry multiple modulated optical wavelengths $\lambda_1$, $\lambda_3$, $\lambda_4$, $\lambda_6$, each associated with one of radio frequency bands L, X, Ku, Q.

In other words, multi-wavelength optical tunable-based laser transmitter 200 is configured to generate a single laser beam containing multiple optical wavelengths. The multiple optical wavelengths are demutiplexed onto separate optical wavelength paths so the multiple optical wavelengths can be modulated with a corresponding radio frequency. The modulated optical wavelengths are then combined onto a single laser beam for transmission.

Figure 3A:
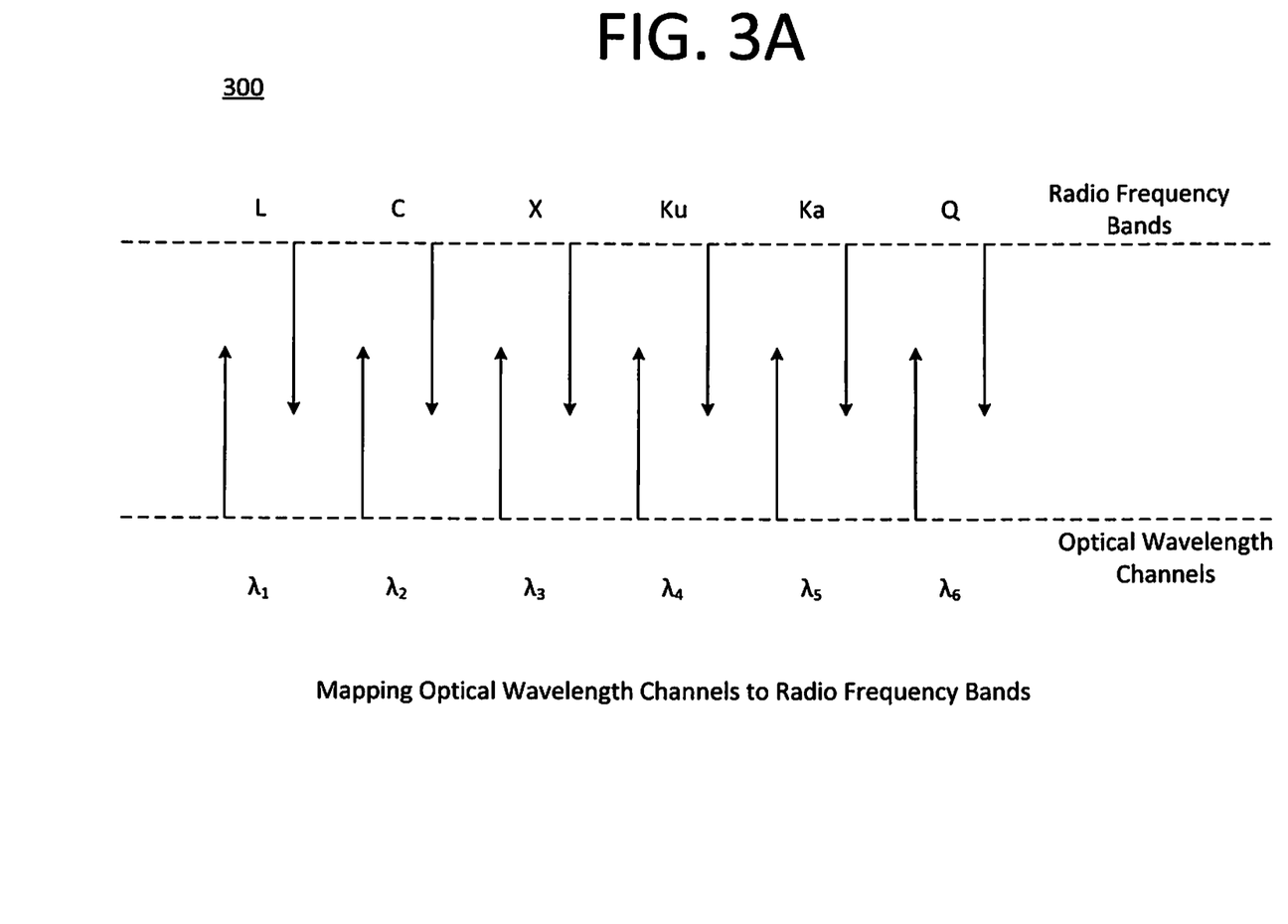
FIG. 3A is a diagram illustrating mapping of optical wavelength channels to radio frequency bands, according to an embodiment of the present invention.

FIG. 3A is a schematic 300 illustrating mapping of optical wavelength channels to radio frequency bands, according to an embodiment of the present invention. In this embodiment, schematic 300 shows the mapping or assignment of each radio frequency band with a corresponding optical wavelength channel. For example, radio frequency band L is assigned to optical wavelength channel $\lambda_1$, radio frequency band C is assigned to optical wavelength channel $\lambda_2$, radio frequency band X is assigned to optical wavelength channel $\lambda_3$, radio frequency band Ku is assigned to optical wavelength channel $\lambda_4$, radio frequency band Ka is assigned to optical wavelength channel $\lambda_5$, and radio frequency band Q is assigned to optical wavelength channel $\lambda_6$.

Figure 3B:
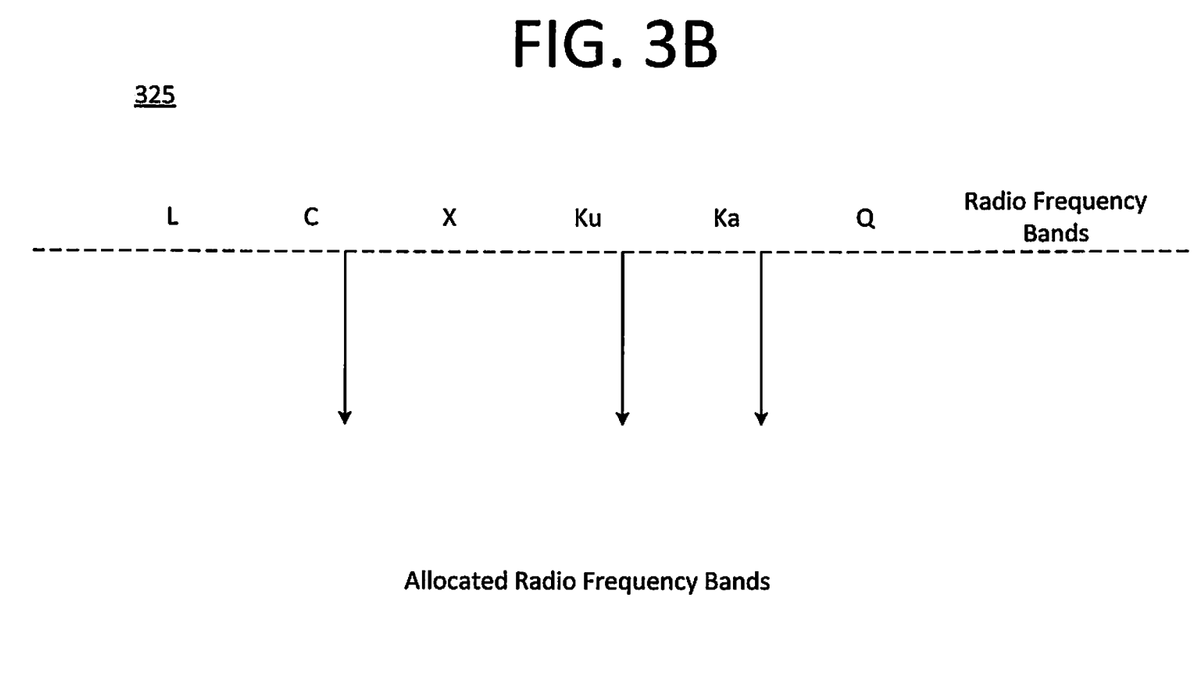
FIG. 3B is a diagram illustrating allocated radio frequency bands, according to an embodiment of the present invention.
Figure 3C:
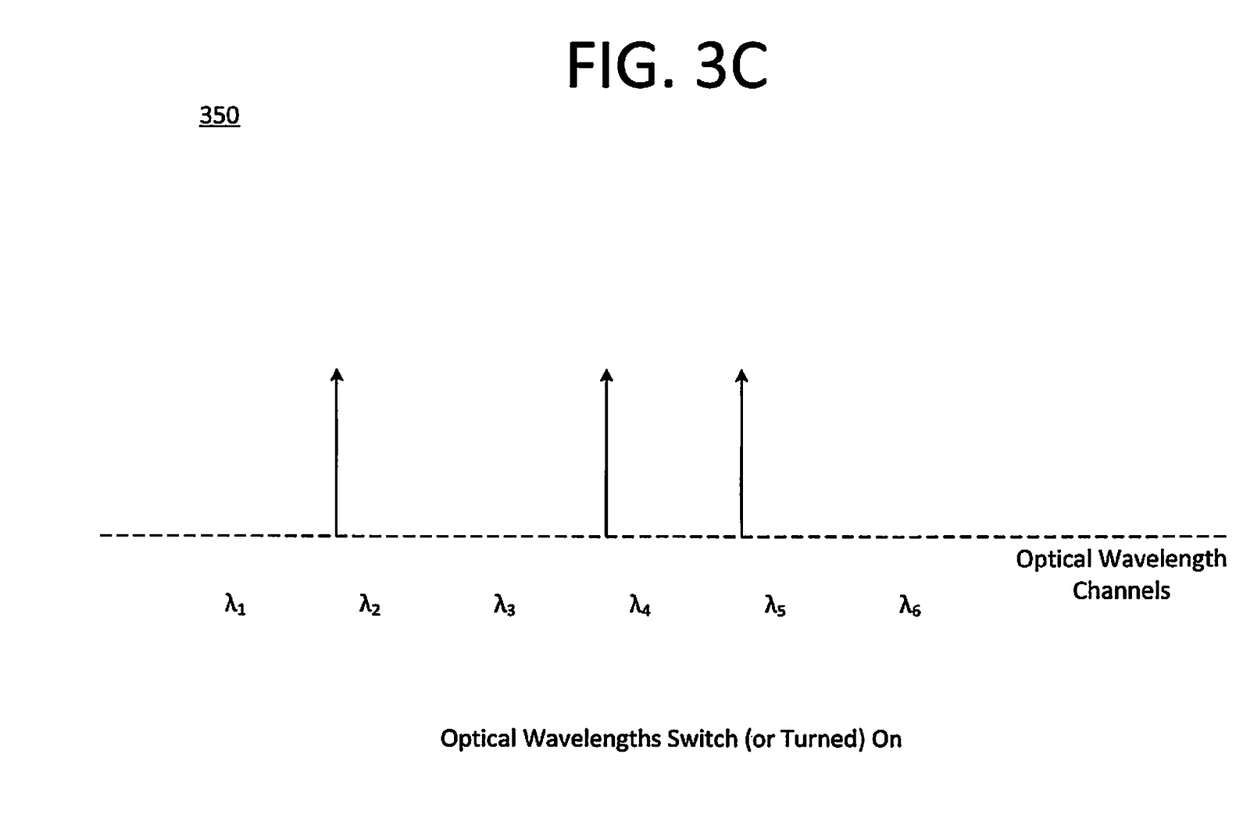
FIG. 3C is a diagram illustrating activated optical wavelengths based on the allocated radio frequency bands, according to an embodiment of the present invention.

FIG. 3B is a schematic 325 illustrating allocated radio frequency bands, according to an embodiment of the present invention. In this embodiment, radio frequency bands C, Ku, and Ka are allocated while radio frequency bands L, X, and Q are not allocated. Since radio frequency bands C, Ku, and Ka are allocated in schematic 325, schematic 350 in FIG. 3C shows that optical wavelengths $\lambda_1$, $\lambda_3$, $\lambda_6$ are turned OFF, while optical wavelengths $\lambda_2$, $\lambda_4$, $\lambda_5$ are turned ON.

Figure 4:
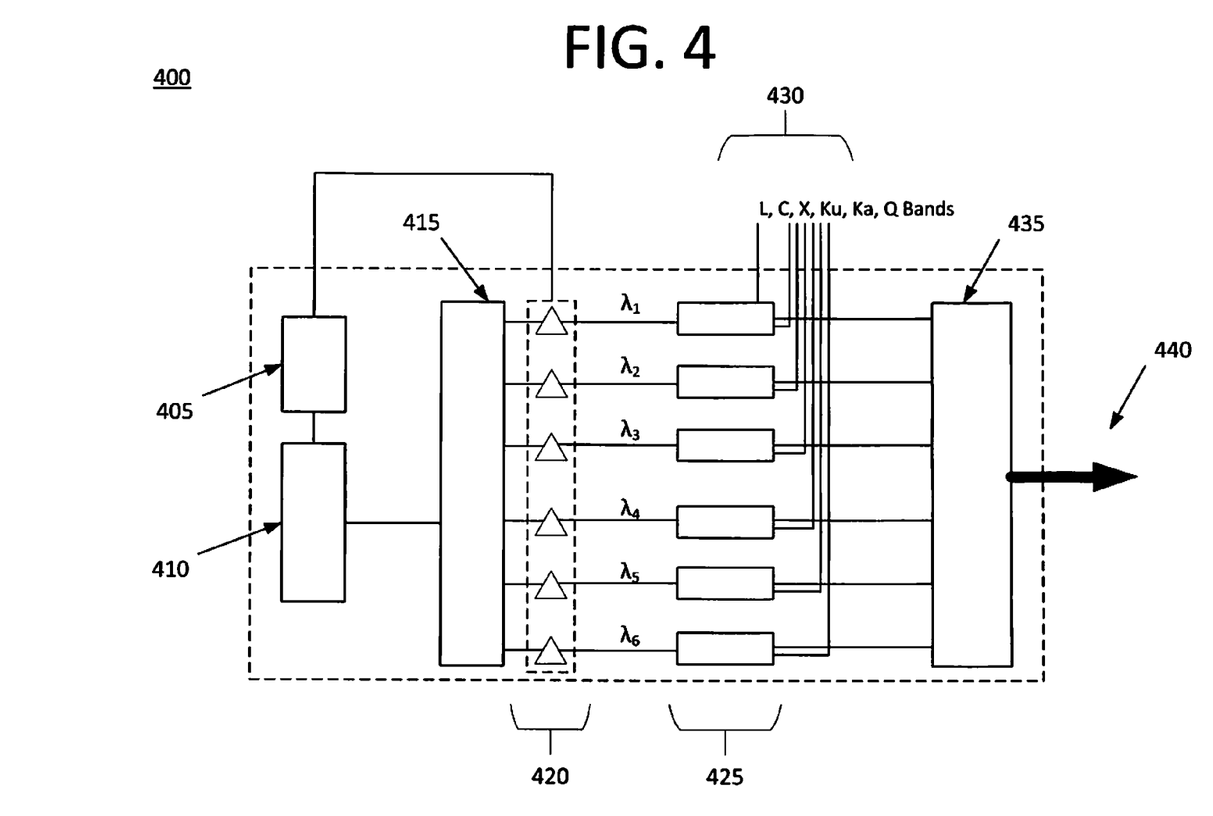
FIG. 4 is a block diagram illustrating an apparatus for packaging the multi-wavelength optical tunable-based laser transmitter, according to an embodiment of the present invention.

FIG. 4 is a block diagram illustrating an apparatus 400 for packaging the optical tunable-based transmitter, according to an embodiment of the present invention. In this embodiment, a multi-wavelength tunable laser 410 generates six optical wavelengths to be transmitted in a single laser beam 440. Based on the selection, multi-wavelength tunable laser 410 combined with a wavelength controller 405 is configured to generate a single laser beam comprising multiple optical wavelengths. In this example, six optical wavelengths $\lambda_1$, $\lambda_2$, $\lambda_3$, $\lambda_4$, $\lambda_5$, $\lambda_6$ are produced corresponding to six radio frequency bands L, C, X, Ka, Ku, Q.

A demultiplexer 415 simultaneously channels all six optical wavelengths into each of the six optical wavelength paths $P_1$, $P_2$, $P_3$, $P_4$, $P_5$, $P_6$. A separate optical filter 420 is used for each wavelength in this embodiment. Optical filters 420 may allow transmission of the optical wavelengths or prevent transmission of the optical wavelengths based on an operation command received from wavelength controller 405.

Electro-optic modulators 425 may receive the optical wavelengths and the radio frequency bands. In this embodiment, each electro-optic modulator 425 may receive a corresponding radio frequency band through a corresponding radio frequency input port 430. Each electro-optic modulator 425 may modulate an optical wavelength with a corresponding radio frequency band. The modulated optical wavelengths are transmitted to a multiplexer 435 to combine the modulated optical wavelengths onto a single laser beam 440 for transmission. Single laser beam 440 includes the multiple optical wavelengths (or lights of different colors).

In summary, the multi-wavelength optical tunable-based transmitter described herein is configured to modulate each optical wavelength with a corresponding radio frequency band and combine each optical wavelength into a single laser beam for transmission, for example, from a vehicle to another vehicle or ground station.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that embodiments of the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus comprising:
a tunable laser configured to generate a plurality of optical wavelengths;
a demultiplexer configured to receive the plurality of optical wavelengths and simultaneously output N number of channels onto N number of optical wavelength paths, where N is an integer greater than 0;
an array of active bandpass optical filters controlled by a wavelength controller and is configured to receive the output of each of the N number of optical wavelength paths;
wherein the wavelength controller is connected to each bandpass optical filter to select a desired output optical wavelength;
wherein the output of each bandpass optical filter is controlled by the wavelength controller to generate the desired optical wavelength;
wherein the N number of optical wavelengths controlled by the wavelength controller is received by N number of electro-optic modulators and modulated by N number of radio frequency bands; and
wherein the N number of modulated optical wavelengths are transmitted to a multiplexer to combine into a single optical beam.

2. The apparatus of claim 1, wherein each of the N number of optical wavelengths are mapped to one of the N number of radio frequency bands.

3. The apparatus of claim 1, wherein the wavelength controller is configured to generate the plurality of optical wavelengths that are to be encoded on the single laser beam for transmission.

4. The apparatus of claim 3, wherein the wavelength controller is further configured to control each filter to select one optical wavelength from the plurality of optical wavelengths intended for transmission on the single laser beam.

5. The apparatus of claim 1, wherein the demultiplexer is configured to channel simultaneously the plurality of optical wavelengths onto each optical wavelength path.

6. The apparatus of claim 1, wherein each active bandpass optical filters is configured to transmit one optical wavelength from the N number of optical wavelengths based on an operation command of the wavelength controller.

7. The apparatus of claim 1, wherein each of the N number of electro-optic modulators are connected to one of the N number of radio frequency band paths and one of the N number of optical wavelength paths.

8. The apparatus of claim 7, wherein each of the N number of electro-optic modulators are configured to modulate an optical wavelength with a corresponding radio frequency band.

9. The apparatus of claim 1, wherein the a multiplexer is configured to encode each of the N number of modulated optical wavelengths onto the single laser beam.

* * * * *